F. E. LINDHORST.
NUT LOCK.
APPLICATION FILED FEB. 12, 1910.

969,548.

Patented Sept. 6, 1910.

WITNESSES:
Harry A. Beiner
W. C. Killen

INVENTOR.
Frank E. Lindhorst.
BY
Emil Starek
ATTORNEY

UNITED STATES PATENT OFFICE.

FRANK E. LINDHORST, OF ST. LOUIS, MISSOURI, ASSIGNOR OF ONE-HALF TO GEORGE HARRIS, OF ST. LOUIS, MISSOURI.

NUT-LOCK.

969,548.      Specification of Letters Patent.      Patented Sept. 6, 1910.

Application filed February 12, 1910. Serial No. 543,501.

*To all whom it may concern:*

Be it known that I, FRANK E. LINDHORST, citizen of the United States, residing at St. Louis, State of Missouri, have invented certain new and useful Improvements in Nut-Locks, of which the following is a full, clear, and exact description, reference being had to the accompanying drawings, forming a part hereof.

My invention has relation to improvements in nut locks; and it consists in the novel construction of lock more fully set forth in the specification and pointed out in the claims.

Figure 1:
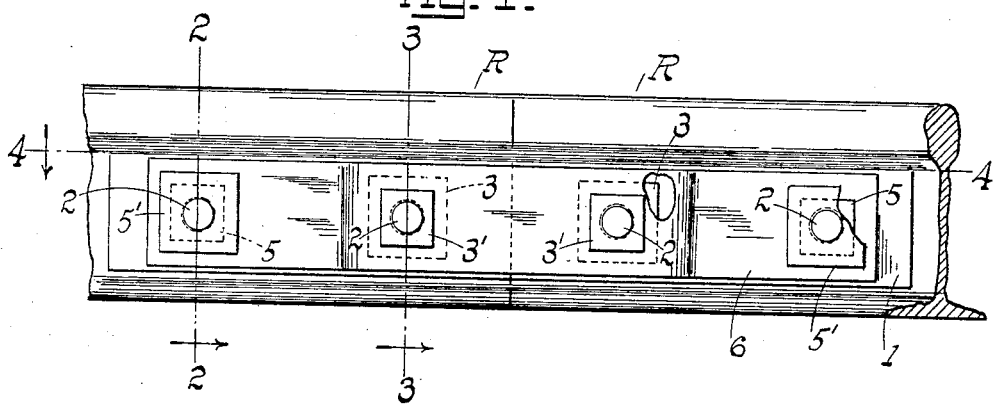
Figure 2:
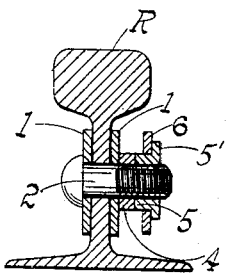
Figure 3:
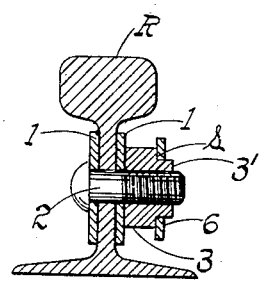
Figure 4:
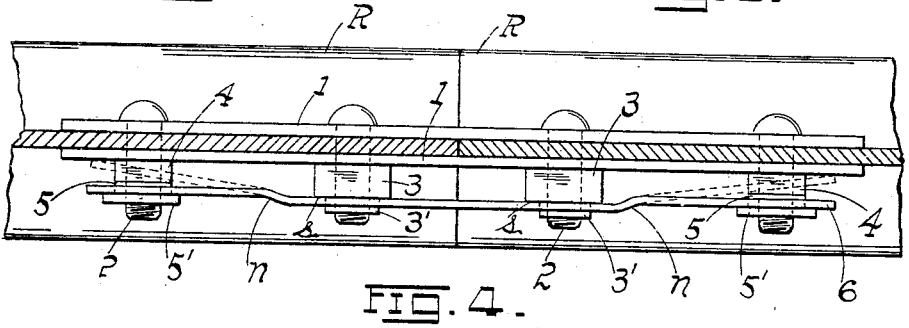

In the drawing, Figure 1 is a side view of a pair of abutting rails showing my invention applied thereto; Fig. 2 is a cross-section on the line 2—2 of Fig. 1; Fig. 3 is a cross-section on the line 3—3 of Fig. 1; and Fig. 4 is a horizontal cross section on the line 4—4 of Fig. 1, taken just below the rail tread.

The present invention is especially applicable as a nut lock in connection with rail fish-plates, and has for its object to lock the entire series of nuts carried by the several bolts by which the plates are secured to the rails. The advantages of the invention will be better apparent from a detailed description thereof, which is as follows:—

Referring to the drawings, R, R, represent two meeting rails, the webs of which are united by the fish plates 1, 1, secured by bolts 2 in the usual way, there being two (or more) bolts on either side of the joint between the rails. The outer faces of the intermediate or inner pair of nuts 3 are provided with reduced portions 3′ forming shoulders s with the main body of the nuts. The nuts here shown are square though a hexagonal nut falls within the spirit of my invention. Over the screw threaded ends of the outer bolts are first passed the inner nut sections or washers 4, after which are passed the nuts 5 proper, the outer faces of the latter being provided with flanges 5′ for a purpose presently to be seen. After driving home the nuts 3, a locking plate 6 provided with square (where the nut is square, and hexagonal where the nut is hexagonal) openings is passed over the reduced portions 3′ of the nuts, the plate being provided on either side of its center with offsets or shoulders n. The depth of the offsets is sufficient to bring the rear face of the central portion of the plate into substantially the same plane with the front face of the terminal portions beyond the offsets, (Fig. 4). The shoulders too impart a special stiffness and resiliency to the terminal portions of the plate.

The process of applying the nut-lock is substantially as follows: (1) apply the washers 4 and nuts 3, driving the latter home; (2) then apply the plate 6 to the reduced portions 3′ of the nuts 3 and over the washers 4, as indicated in dotted lines in Fig. 4; (3) then apply the nuts 5, driving them home; (4) then tap the plate 6 making its ends spring into place against the enlarged portions 5′ of the nuts 5.

Since the rear faces or walls of the flanges are substantially in the plane of the front faces of the nuts 3, and since the entire plate is more or less resilient, the tendency of the free ends of the locking plate or those portions outside the offsets $n$ will be to permanently press outwardly on the flanges 5′, whereas the middle portion of the plate will exert a pressure in the opposite direction or inwardly against the nuts 3, 3. This insures for the free ends of the locking plate a tendency to hug the flanges 5′ of the outer pair of nuts 5, and since the polygonal portions of the several nuts are confined in correspondingly formed openings in the plate, it follows that none of the nuts can turn, so the plate acts as a nut-lock for them all.

Obviously the locking plate is not restricted in its application to locks for nuts on railways, but may be availed of in bridgework and other constructions.

Having described my invention, what I claim is:—

1. In combination with a series of bolts and nuts carried thereby, a locking member having the intermediate portion of one face thereof exerting a pressure against adjacent nuts, in one direction, the terminal portions of the opposite face of the member exerting a pressure against adjacent nuts in the opposite direction, the member being provided with openings for the passage therethrough of the outer terminals of the intermediate nuts.

2. In combination with a series of bolts, nuts passed over the same, the intermediate nuts having outer polygonal reduced portions, and the terminal nuts having outer flanges formed thereon, a complementary member or washer at the inner end of each terminal nut, and a locking plate having openings for receiving the reduced extensions of the intermediate nuts and the bodies of the terminal nuts, the plate having offsets to bring the inner face of its intermediate portion in contact with the outer faces of the intermediate nuts, and the outer faces of the end portions into contact with the rear faces of the flanges of the outer nuts, and for permitting of sufficient temporary inward deflection of the end portions to be passed over the washers during the driving home of the terminal nuts, substantially as set forth.

3. In combination with a series of three or more nuts, the outer pair of which terminate in a flange extending beyond the body of the nut, and the intermediate nuts terminating in a reduced polygonal portion, a locking plate having openings passed over the reduced portions of the intermediate nuts and bearing against the faces of the nuts, and other openings passed over the bodies of the outer pair of nuts and engaging the rear faces of the flanges thereof, substantially as set forth.

In testimony whereof I affix my signature, in presence of two witnesses.

FRANK E. LINDHORST.

Witnesses:
W. C. KILLEEN,
JACK W. JOHNSON.